United States Patent [19]

Wooten et al.

[11] 4,352,924

[45] Oct. 5, 1982

[54] THERMOSETTING POWDER COATING COMPOSITIONS

[75] Inventors: Willis C. Wooten; Winston J. Jackson, Jr.; Herbert F. Kuhfuss, all of Kingsport, Tenn.

[73] Assignee: Eastman Kodak Company, Rochester, N.Y.

[21] Appl. No.: 278,229

[22] Filed: Jun. 29, 1981

[51] Int. Cl.$^3$ .............................................. C08G 63/16
[52] U.S. Cl. .................................... 528/302; 525/440; 525/443; 528/274; 528/308; 528/309
[58] Field of Search ................ 525/440, 443; 528/274, 528/302, 308, 309

[56] References Cited

U.S. PATENT DOCUMENTS

| | | | |
|---|---|---|---|
| 3,686,360 | 8/1972 | Cunningham | 525/443 |
| 3,842,021 | 10/1974 | Grant et al. | 525/440 |
| 4,075,180 | 2/1978 | Davis et al. | 528/309 X |
| 4,275,189 | 6/1981 | Danick et al. | 528/309 X |

*Primary Examiner*—Lucille M. Phynes
*Attorney, Agent, or Firm*—John F. Stevens; Daniel B. Reece, III

[57] ABSTRACT

Disclosed are crystalline polyesters having low melt viscosities and thermosetting compositions comprising these polyesters. The compositions are especially useful as powder coatings. The polyesters are derived from 1,4-butanediol and trans-1,4-cyclohexanedicarboxylic acid. The polyesters are characterized as having a molecular weight of about 700–3000, a melt viscosity of about 50–3500 cps at 160° C. and a hydroxyl number of about 35–160. The thermosetting composition contains a curing agent which is reactive with the hydroxyl groups to crosslink the polyester.

12 Claims, No Drawings

THERMOSETTING POWDER COATING COMPOSITIONS

TECHNICAL FIELD

This invention relates to thermosetting polyester compositions especially adapted for use as powder coatings.

BACKGROUND ART

Thermosetting polyesters having long been used in surface coatings. Hydroxyl and carboxyl groups are most frequently utilised to impart reactive functionality to these resins. In the area of powder coatings, hydroxyl-functional polyesters are usually cured using alkoxymelamine, anhydride or blocked isocyanate crosslinkers. Typical of the hydroxylated polyesters known for use in coating formulations are those derived from various combinations of terephthalic acid, neopentyl glycol, cyclohexanedimethanol, and polyols such as trimethylolpropane. Such polyesters are generally amorphous and have relatively high melt viscosities at fusion temperatures. These resins, at a typical fusion temperature of 160° C., have melt viscosities in excess of about 6500 cps, and often in excess of 10,000 cps.

The high melt viscosity tends to limit the flow of the molten coating and hence adversely affects the smoothness and gloss of the finished coating. Cure speed of these resins depends upon the type of crosslinking agent used. They are all designed for cure with blocked isocyanates but none are recommended for use at cure schedules less than 160° C. for 35 minutes. Below these recommended temperatures, the coatings have a poor appearance and poor physical properties are obtained.

Patents of interest include U.S. Pat. No. 4,094,721 which discloses copolyesters of terephthalic acid, 1,4-butanediol and 1,6-hexanediol. These copolyesters, however, have a relatively high molecular weight and a relatively high melt viscosity, which satisfies the requirements for the intended purpose, i.e., a fusion adhesive. The high melt viscosity tends to limit the flow of the molten coating and hence adversely affects the smoothness and gloss of the finished coating. Cure speed of these resins depends upon the type of crosslinking agent used.

DISCLOSURE OF THE INVENTION

The crystalline polyesters described herein have several advantageous properties which render them superior to the conventional amorphous thermoset polyesters currently used in powder coatings, e.g., (a) The crystalline polyesters of this invention tend to have lower melt viscosities at a given molecular weight than those normally associated with the amorphous polyesters of similar molecular weight which are currently used in powder coatings. This means that powder coatings based on these crystalline, thermoset polyesters generally flow better on fusion, resulting in less orange peel and smooth coatings having high gloss.

(b) The crystalline polyesters react more rapidly with the blocked isocyanate crosslinker than would be expected. This results in coating formulations which will cure at temperatures as low as 150° C. With suitable curing agents, even lower curing temperatures might be achieved.

(c) The crystalline polyesters, when incorporated into powder formulations cured with blocked isocyanate crosslinker, give finished coatings having outstanding physical properties.

(d) The crystalline nature of the resins enhances their anti-blocking properties at room temperature.

(e) The crystalline polymers impart a more rapid build-up of physical properties to the coatings during fusion compared to currently used commercial resins.

The present invention provides copolyesters particularly useful in thermosetting compositions, more particularly, thermosetting powder coating compositions such as might be used as automobile coatings. The copolyesters are linear, saturated and crystalline, and are derived from 1,4-butanediol, 0–50 mole % of terephthalic acid and 50–100 mole % of trans-1,4-cyclohexanedicarboxylic acid. Up to about 10 mole % of the 1,4-butanediol may be replaced with a glycol having 2 to 12 carbon atoms such as ethylene glycol, propylene glycol, neopentyl glycol, 1,6-hexanediol, etc. When "trans" 1,4-cyclohexanedicarboxylic acid is referred to herein, it is intended to mean at least 80% trans-isomer.

The polyesters are further characterized as having a number average molecular weight of about 700–3000, preferably about 1000–2000. Also, the polyesters have a melt viscosity of about 50–3500 cps at 160° C. The hydroxyl number is in the range of about 35–160, preferably about 50–125. Normally, the glass transition temperature (Tg) is within the range of about −10° C. to about +10° C.

The polyesters described herein have the unique ability to form thermosetting powder coatings which have low melt viscosities, thereby allowing the powder to flow out to form a smooth coating prior to setting up. On the other hand, the powder is resistant to caking.

The copolyesters of this invention contain trans-1,4-cyclohexanedicarboxylic acid moieties and may contain terephthalic acid moieties. These moieties can be supplied by the usual sources, e.g., terephthalic acid, trans-1,4-cyclohexanedicarboxylic acid, terephthaloyl chloride and the mono and dialkyl esters of these acids. The polyester contains 0–50 mole % terephthalic acid and 100–50 mole % trans-1,4-cyclohexanedicarboxlic acid, based on the acid moieties.

The polyesters according to this invention are prepared using conventional esterification techniques well known in the art. Some excess glycol is used, and the reaction is such that the polymer is of a relatively low molecular weight, i.e., about 700–3000. The excess glycol and low molecular weight provide for the functional hydroxyl groups in the polymer for crosslinking, thereby making the polymer thermosetting.

Suitable curing or crosslinking agents for use with thermosetting resins containing functional hydroxyl groups, i.e., the polyesters disclosed herein, are well known in the art. Such curing agents include blocked isocyanates and melamines. An example of a preferred isocyanate is Huls B1530, a caprolactam-blocked polyfunctional isocyanate. Suitable melamines include alkoxymelamine wherein the alkoxy group contains 1 to 8 carbon atoms. Specific examples are Cymel 300 and Cymel 303 hexamethoxymethyl melamines. The curing agents are used in amounts of between about 20% and 40%, preferably 25–30%, based on the weight of polyester. By blocked curing agents, it is meant that the curing agent is temporarily deactivated or neutralized so as to allow the powder to flow out and form a smooth coating prior to crosslinking. Blocked curing agents and catalysts are well known in the art, e.g., U.S. Pat. No. 3,842,021. In any case, it is preferred that the curing agent be blocked, so as to allow complete flow-out of the powder to eliminate or reduce orange-peel and thereby produce a smooth coating prior to the coating setting up by crosslinking.

Although the thermosetting composition containing the polyester and curing agent has been found to cure without the use of a catalyst at temperatures as low as about 150° C., it is sometimes desirable to use a catalyst. Suitable catalysts are well known in the art and include acid catalysts such as p-toluenesulfonic acid for melamines and dilaurylthiodipropionate for isocyanates.

The thermosetting composition may also contain a suitable plasticizer. The plasticizer must be sufficiently compatible to avoid a sticky formulation. Suitable plasticizers include dioctyl phthalate, dibutyl phthalate, butyl benzyl phthalate, 2,2,4-trimethylpentanediol-1,3-monoisobutyrate monobenzoate, trioctyl trimellitate, an ester derived from neopentyl glycol and adipic acid, or the like.

Conventional stabilizers, such as Irganox 1093, a product of Ciba-Geigy, may be used in small amounts to prevent discoloration, etc. Also, conventional dyes or pigments such as R-100 titanium dioxide pigment marketed by Du Pont may be used. Conventional flow acids, fillers, preservatives, etc., may also be used.

The components of the compositions according to this invention may be mixed by dry blending in a mixer or blender (e.g., a Waring Blender), followed by compounding in a Brabender Extruder ($\frac{3}{4}$") at 115°–130° C. and 50–100 r.p.m., granulating, cryogenically grinding and then screening to obtain a 150 mesh powder for coating. Also, the polyester pigment and stabilizer, if used, may be extruded at about 200° C., then mixed with the crosslinking agent, catalyst, and plasticizer (if used) in a Banbury mixer, a combination of a Banbury mixer and roll mill, a roll mill alone or an extruder at a temperature of between about 110° C. and 150° C. Alternately, all the components may be dissolved in a solvent such as methylene chloride (at about 20 weight percent solids) and spray dried at a chamber temperature of about 50° C. by well-known techniques.

The powdered composition may be deposited on the substrate by use of a powder gun, by electrostatic deposition or by deposition from a fluidized bed or by other well-known methods of powder deposition. After deposition the powder is heated to a temperature sufficient to cause its particles to flow and thus fuse together to form a smooth, uniform, continuous, uncratered coating on the substrate surface.

The following examples are submitted for a better understanding of the invention. In the examples, the physical properties of the coatings are determined as follows:

Adhesion Tape Test

Seven horizontal score lines about 7-1/16 inch apart are crossed with seven vertical score lines about 1/16 inch apart using a sharp razor blade to cut through the coating to the metal. Pressure sensitive tape (Scotch) is pressed down firmly over the cross-hatched pattern and pulled off rapidly. A complete failure is recorded when the coating is completely peeled off. A partial failure is noted when 5 squares or more are lifted and a slight failure is identified when less than five squares are lifted. When the coating is brittle, as may occur from degradation, it does not have the cohesive strength to peel, and hence splits next to the score line giving an apparent appearance of good adhesion since the bulk of the coating is not removed. It is necessary to examine the tape and the coating for signs of such behavior being due to brittleness and not adhesion.

Caking at 80° F.

Samples of 3–5 grams are placed in a container and allowed to age for a selected time (usually 48 hours) at the indicated temperature. The samples are then inverted and inspected visually for caking.

Impact Strength

Impact strength is determined by using a Gardner Laboratory, Inc., Impact Tester. A weight is dropped within a slide tube from a specified height to hit a punch having a $\frac{5}{8}$ inch diameter hemispherical nose which is driven into the front (coated face) or back of the panel. The highest impact which does not crack the coating is recorded in inch-pounds, front and reverse.

Flexibility

The test panel is bent over a period of 15 seconds, using a Gardner Laboratory, Inc., conical mandrel of specified size, according to ASTM D-522. A pass or fail is recorded.

Twenty degree and sixty degree gloss are measured using a gloss meter (Gardner Laboratory, Inc., Model GC-9095) according to ASTM D-523.

Pencil Hardness

The pencil hardness of a coating is that of the hardest pencil that will not cut into the coating. The procedure for preparing the truncated cone pencil lead and carrying out the test is given in the National Coil Coaters Association Technical Bulletin No. II (August 12, 1968). Results are expressed according to the following scale:

(softest) 6B, 5B, 4B, 3B, 2B, B, HB, F, H, 2H, 3H, 4H, 5H, 6H (hardest)

Orange Peel Rating

In order to obtain appearance as a numerical value for identification, the following rating system for "orange peel" appearance and crater evaluation is used:

8—None
7—Trace
6—Very slight
5—Slight
4—Slight to moderate
3—Moderate
2—Moderate to heavy
1—Heavy
0—Very heavy

Gloss

Twenty degree and sixty degree gloss are measured using a gloss meter (Gardner Laboratory, Inc., Model GC-9095) according to ASTM D-523.

Fusion of the Coating

Test panels are placed in a Freas Model 625A forced air oven and fused at a specified temperature for a specified time. The fused coatings are then hung on a bar to cool at room temperature.

All inherent viscosities are determined at 25° C. in a (60/40 by weight) mixture of phenol/tetrachloroethane at a concentration of 0.5 g/100 ml. The melting points are determined with a Perkin-Elmer DSC-2 differential scanning calorimeter.

This invention will be further illustrated by the following examples although it will be understood that these examples are included merely for purposes of illustration and are not intended to limit the scope of the invention.

EXAMPLE 1

This example illustrates the typical procedure for preparing the polyesters of this invention. A mixture of 189 g (2.1 mole) of 1,4-butanediol, 168 g (0.84 mole) of dimethyl trans-1,4-cyclohexanedicarboxylate, and 108.6 g (0.56 mole) of dimethyl terephthalate, and 0.9 ml of titanium tetraisopropoxide/butanol solution (100 ppm Ti) is placed in a 500-ml flask equipped with a stirrer, a short distillation column, and an inlet for nitrogen. The flask and contents are heated under nitrogen atmosphere in a Wood's metal bath with stirring to a temperature of 170° C. at which point methanol begins to distill rapidly from the flask. After the reaction mixture is heated with stirring at this temperature for about 1 hr., the temperature of the bath is increased to 220° C. for about 1 hr. and then to 240° C. A vacuum of 10 mm of mercury is then applied over a period of 18 minutes. After stirring is continued under 10 mm of mercury at 240° C. for about 75 minutes, a low melt viscosity, colorless polymer is obtained. The polymer has an inherent viscosity of 0.20, a melting point of 157° C., a number average molecular weight of 2650 and a hydroxyl number of 51.

Polyesters derived from the components indicated below are prepared by the general procedure described in Example 1:

Polyester A 60 mole % trans-1,4-cyclohexanedicarboxylic acid
40 mole % terephthalic acid
100 mole % 1,4-butanediol

Polyester B 80 mole % trans-1,4-cyclohexanedicarboxylic acid
20 mole % terephthalic acid
100 mole % 1,4-butanediol

Polyester C 50 mole % trans-1,4-cyclohexanedicarboxylic acid
50 mole % terephthalic acid
100 mole % 1,4-butanediol

TABLE I

RESIN CHARACTERISTICS

| Polyester | Molecular[1] Wt. | Hydroxyl No. | Melt[2] Viscosity, CPS @ 160° C. |
|---|---|---|---|
| A | 2,520 | 53 | 840 |
| B | 1,900 | 64 | 530 |
| C | 1,130 | 101 | 130 |

[1]Determined by Vapor Phase Osmometry.
[2]Determined using Ferranti-Shirley Melt Viscometer - medium cone at 563 sec.$^{-1}$ The polyesters described above are used in the following formulations:

| | Formulations, Wt. % | | |
|---|---|---|---|
| | A | B | C |
| Polyester A | 79.0 | — | — |
| Polyester B | — | 76.0 | — |
| Polyester C | — | — | 67.0 |
| Crosslinking Agent (tri functional isocyanate, based on isophorone diisocyanate trimerized and blocked with caprolactam) | 21.0 | 24.0 | 33.0 |
| Filler (ground calcium carbonate) | 60.0 | 60.0 | 60.0 |
| Titanium Dioxide | 10.0 | 10.0 | 10.0 |
| Flow Modifier (dicyclo hexyl phthalate) | 1.0 | 1.0 | 1.0 |

The properties of the crystalline resins make them particularly suited for use in powder coatings, both in high filler content auto primer surfacer formulations and high gloss top coat formulations for a wide variety of metal products, e.g., appliances, furniture, cycles, etc. The performance of representative resins in powder primer surfacers is shown in Examples 2-19. The crosslinking agent used in all cases is a caprolactam-blocked polyfunctional isocyanate. Prior to coating substrates using conventional application techniques (e.g., spray, fluidized bed, etc.), the coating formulations are formed into small particles.

In Examples 2-10, the fusion time is 45 minutes and the fusion temperature is 163° C.; in Examples 11-19, the fusion time is 15 minutes and the fusion temperature is 180° C.

All of the primer surfacer formulations readily cured to give finishes having low orange peel.

| Ex. | Formulation | Thickness, micrometers | 20° Gloss | Peel Adhesion | Pencil Hardness | Orange Peel Rating | Impact Resistance Front (in. lbs.) | Impact Resistance Reverse (in. lbs.) | Flexibility ⅛" conical mandrel |
|---|---|---|---|---|---|---|---|---|---|
| 2 | A | 18 | 37 | Pass | F | 6-7 | >160 | >160 | No Cracking |
| 3 | A | 48 | 38 | Pass | HB | 7-5 | >160 | >160 | No Cracking |
| 4 | A | 72 | 37 | Pass | B | 7-8 | >160 | >160 | 9mm Cracking |
| 5 | B | 18 | 35 | Pass | F | 6 | >160 | >160 | No Cracking |
| 6 | B | 36 | 38 | Pass | HB | 7-1 | >160 | >160 | No Cracking |
| 7 | B | 61 | 35 | Pass | HB | 7-3 | 80 | 40 | 22mm Cracking |
| 8 | C | 18 | 50 | Pass | HB | 7-1 | >160 | >160 | No Cracking |
| 9 | C | 53 | 63 | Pass | B | 7-5 | >160 | >160 | No Cracking |
| 10 | C | 74 | 66 | Pass | B | 7-7 | >160 | >160 | No Cracking |
| 11 | A | 20 | 14 8 | Pass | F | 6-7 | >160 | >160 | No Cracking |
| 12 | A | 40 | 34 | Pass | HB | 7-3 | >160 | >160 | No Cracking |
| 13 | A | 74 | 33 | Pass | B | 7-8 | >160 | >160 | No Cracking |
| 14 | B | 16 | 29 | Pass | HB | 5 | >160 | >160 | No Cracking |
| 15 | B | 34 | 32 | Pass | HB | 7-1 | >160 | >160 | No Cracking |
| 16 | B | 71 | 30 | Pass | B | 7-3 | >160 | >160 | No Cracking |
| 17 | C | 21 | 48 | Pass | HB | 7-2 | >160 | >160 | No Cracking |
| 18 | C | 32 | 54 | Pass | B | 7-4 | >160 | >160 | No Cracking |

| Ex. | Formulation | Thickness, micrometers | 20° Gloss | Peel Adhesion | Pencil Hardness | Orange Peel Rating | Impact Resistance | | Flexibility ⅛" conical mandrel |
|---|---|---|---|---|---|---|---|---|---|
| | | | | | | | Front (in. lbs.) | Reverse (in. lbs.) | |
| 19 | C | 59 | 57 | Pass | B | 7-7 | >160 | >160 | No Cracking |

The foregoing examples illustrate the low viscosity characteristics, good flow art, good impact resistance and flexibility, low cure temperatures. It is noted, however, that (bite) appeared in the samples as is common in crystalline resins. The formulations blocked to varying extents after 72 hours at 40° C., with severe blocking in the case of Formulation C.

Hydroxyl number is a conventional, well known term, meaning the number of free hydroxyl groups, calculated in terms of milligrams of potassium hydroxide per gram of sample, over and above the amount required to neutralize any acid groups that are present.

Number average molecular weight (used herein) is also a conventional term, and is determined by the well known technique of vapor pressure osmometry.

Viscosity is determined in centipoises at specified temperatures using a conventional Shirley-Ferranti Viscometer.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. A linear saturated crystalline polyester of an acid moiety and a moiety of a dihydric alcohol, at least 50 mole percent of the acid moeity being of trans-1,4-cyclohexanedicarboxylic acid and 0-50 mole percent being of terephthalic acid, and the dihydric alcohol moieties consisting essentially of 1,4-butanediol, said polyester being further characterized as having a molecular weight of about 700-3000, a melt viscosity of about 50-3500 cps at 160° C. and a hydroxyl number of about 35-160.

2. A thermosetting composition comprising
   (a) a linear saturated crystalline polyester of an acid moiety and a moiety of a dihydric alcohol, at least 50 mole percent of the acid moiety being trans-1,4-cyclohexanedicarboxylic acid and the dihydric alcohol consisting essentially of 1,4-butanediol, said polyester being further characterized as having a molecular weight of about 700-3000 cps at 160° C. and a hydroxyl number of about 35-160, and
   (b) a curing agent which is reactive with hydroxyl groups to crosslink said polyester.

3. A thermosetting composition comprising
   (a) a linear saturated crystalline polyester of an acid moiety and a moiety of a dihydric alcohol, at least 50 mole percent of the acid moiety being trans-1,4-cyclohexanedicarboxylic acid and the dihydric alcohol consisting essentially of 1,4-butanediol, said polyester being further characterized as having a molecular weight of about 1000-2000, a melt viscosity of about 50-1000 cps at 160° C. and a hydroxyl number of about 50-125, and
   (b) from about 10 to about 40%, based on the weight of said polyester, of a curing agent which is reactive with hydroxyl groups to crosslink said polyester.

4. A composition according to claim 2 wherein the molecular weight of said polyester is about 1000-2000.

5. A composition according to claim 2 wherein the hydroxyl number of said polyester is about 50-125.

6. A composition according to claim 2 wherein said curing agent is selected from the group consisting of blocked isocyanates and melamines.

7. A composition according to claim 5 wherein said curing agent is an alkoxymelamine wherein the alkoxy group contains from 1 to 8 carbon atoms.

8. A composition according to claim 2 which further contains a catalyzing amount of an acid catalyst.

9. A composition according to claim 7 wherein said catalyst is present in an amount of from about 0.01 to about 5%, based on the weight of the polyester.

10. A composition according to claim 2 in particulate form of a size suitable for coating as a powder.

11. A composition according to claim 7 in particulate form of a size suitable for coating as a powder.

12. A thermosetting powder composition comprising
   (a) a linear saturated crystalline polyester of an acid moiety and a moiety of a dihydric alcohol, at least 50 mole percent of the acid moiety being trans-1,4-cyclohexanedicarboxylic acid and the dihydric alcohol consisting essentially of 1,4-butanediol, said polyester being further characterized as having a molecular weight of about 1000-2000, a melt viscosity of about 50-1000 cps at 160° C. and a hydroxyl number of about 50-125,
   (b) from about 10 to about 40%, based on the weight of said polyester of a curing agent which is reactive with hydroxyl groups to crosslink said polyester, and
   (c) a catalyzing amount of an acid catalyst.

* * * * *